July 2, 1957 F. G. ROHM 2,797,671
EXHAUST EJECTOR INSTALLATION FOR ENGINE
Filed Jan. 21, 1954 4 Sheets-Sheet 4

INVENTOR.
FREDRIC G. ROHM.
BY Alden D. Redfield
Warren Kunz.
ATTORNEYS.

[United States Patent Office — 2,797,671 — Patented July 2, 1957]

2,797,671
EXHAUST EJECTOR INSTALLATION FOR ENGINE

Fredric G. Rohm, Montoursville, Pa., assignor to Avco Manufacturing Corporation, Cincinnati, Ohio, a corporation of Delaware Application January 21, 1954, Serial No. 405,295

10 Claims. (Cl. 123—41.64)

The present invention relates to an internal combustion engine and more particularly to means for efficiently cooling such an engine in a submerged installation.

For many years air cooled engines have been used in aircraft installations because of the availability of a large supply of cooling air obtained either from the forward motion of the plane, as by ram effect, or from the propeller wash, or from both. Recently, however, applications for aircraft engines have been evolved in which the engines are submerged within the fuselage or wing of the plane in such a fashion that it is inconvenient or impossible to use such a supply of air for engine cooling purposes. As an example, helicopters, because of their physical configuration, lend themselves well to submerged installations but at the same time present a very substantial problem from the viewpoint of efficient engine cooling.

One solution to the cooling problem of helicopter engines has been the provision of a fan, directly driven by the engine, for creating a flow of cooling air over the cylinders. Although installations of this type have been satisfactory from a cooling standpoint, they involve the use of relatively heavy and complicated fans and mechanical drives, and require a sizeable amount of power, in the order of 40 H. P. for cooling a 400 H. P. engine. Further, the size of such a fan and location relative to the engine are not always compatible with the space available in the helicopter or airplane. The same engine in different installations may require the development of entirely different cooling fan arrangements.

From actual tests, it has been established that a 400 H. P. engine can be satisfactory cooled by use of the present invention with an expenditure of only 18 H. P.

It is the principal object of the present invention to provide efficient means for cooling an engine in a submerged installation which does not require complicated mechanical drives and which does not add appreciably to the installed weight of the engine.

More specifically, it is an object of the present invention to provide means by which the momentum of the exhaust gases from the engine is used effectively to reduce the restrictive effects of exhaust pipes and ejector nozzles on the power output of the engine, while simultaneously establishing, through the use of ejectors, an adequate flow of cooling air over the engine. Constructive use of the momentum of the exhaust gases thereby provides a greater net engine power output and a greater cooling air flow than is possible to attain with the same ejector configuration but without the constructive use of the momentum of the exhaust gases.

Still more specifically stated, the present invention comprehends the attainment of the following objectives:

(a) Engine cooling by an exhaust gas pump in the form of ejectors.

(b) Operation of such ejectors at a minimum cost in terms of engine power output.

(c) Arrangement of exhaust pipes to supply the ejectors with a relatively uniform flow of exhaust gases through optimum phasing of exhaust gas pulsations from the engine cylinders.

(d) Arrangement and proportionality of the exhaust pipes whereby the momentum of the exhaust gases from each individual cylinder creates pulsations in the exhaust pipes which are so phased that a resulting partial evacuation aids in the scavenging of the cylinder or, in the scavenging of another cylinder, using combinations most desirable for reduction of exhaust system losses.

(e) Suppression of exhaust flame through dilution of exhaust gases by cooling air. This is particularly desirable in military aircraft subject to enemy action during night operations.

Briefly stated, the illustrated embodiment of the present invention comprises an air cooled aircraft engine, the exhaust pipes from the cylinders of which are joined in pairs by nozzles through which the exhaust products from the engine are supplied to a plurality of ejectors. For efficient operation these ejectors may, in turn, communicate with other ejectors, thereby constituting for each pair of exhaust pipes a two-stage ejector installation through which a flow of engine cooling air can be induced.

Each of the pairs of exhaust pipes communicates with cylinders which fire at evenly spaced time intervals. For example, in the eight-cylinder, four-cycle engine which has been illustrated for convenience, cylinders which fire at 360° intervals of crankshaft rotation have been joined by each pair of exhaust pipes. In this way, the exhaust impulses passing through the joined pipes are evenly spaced and a relatively uniform flow of exhaust gases can be established through the ejectors. Further, by evenly spacing or phasing the exhaust impulses, interference of the exhaust blow-down of one cylinder with that of another can be eliminated through avoidance of overlap of effective exhaust valve openings of cylinders exhausting into joined pipes.

Proportionality of the exhaust pipes themselves is of cardinal importance in this invention. In addition to the beneficial operation attained through proper exhaust phasing, it has been found possible to significantly improve cylinder scavenging through controlled pulsation of exhaust gas in the mutually joined pairs of exhaust pipes.

It is well-known that the exhaust blow-down from a cylinder sets up pressure surges within an associated exhaust pipe. If the proportionality of the exhaust pipe is properly chosen, advantage can be taken of its natural resonant frequency to produce a rarefaction at the exhaust port of the cylinder to which it is attached or, at the exhaust port of another cylinder by proper interconnection of the pipes, the rarefaction favoring more complete scavenging of that cylinder during the exhaust cycle. A given proportionality of exhaust pipes will produce beneficial results over a certain range of engine speeds as will be explained later in this specification.

In the present invention, this principle is used to advantage in each pair of exhaust pipes. Since the exhaust impulses from each of the cylinders joined are evenly spaced in time, evacuation of the pipes adjacent the exhaust ports can be established to favor scavenging of the cylinders alternately exhausting into the paired pipes. Thus, the gas surge resulting from the blow-down of one cylinder will stimulate a pressure pulsation in both of the mutually joined exhaust pipes. If both pipe lengths are properly proportioned for the engine design speed (which is relatively constant in a helicopter installation), the momentum of the exhaust gas from one cylinder may be made to cause a rarefaction at the exhaust port of its mutually joined cylinder and vice versa, allowing each cylinder to aid in the scavenging of the other.

Considerable latitude exists in the design of the exhaust pipes. It is not necessary that a pipe having one particular natural frequency be used. The primary consideration is that the exhaust pipe lengths chosen be such that the exhaust surge created by the blow-down of one cylinder oscillates in the pipe of the next cylinder to exhaust in proper phased relationship to create an evacuation at its exhaust port at the time of exhaust blow-down.

The novel feaures that I consider characteristic of my invention are set forth in the appended claims; the invention itself, however, both as to its organization and method of operation, together with additional objects and advantages thereof, will best be understood from the following description of a specific embodiment when read in conjunction with the accompanying drawings, in which:

GENERAL ORGANIZATION OF THE COMBINATION

Figure 1:
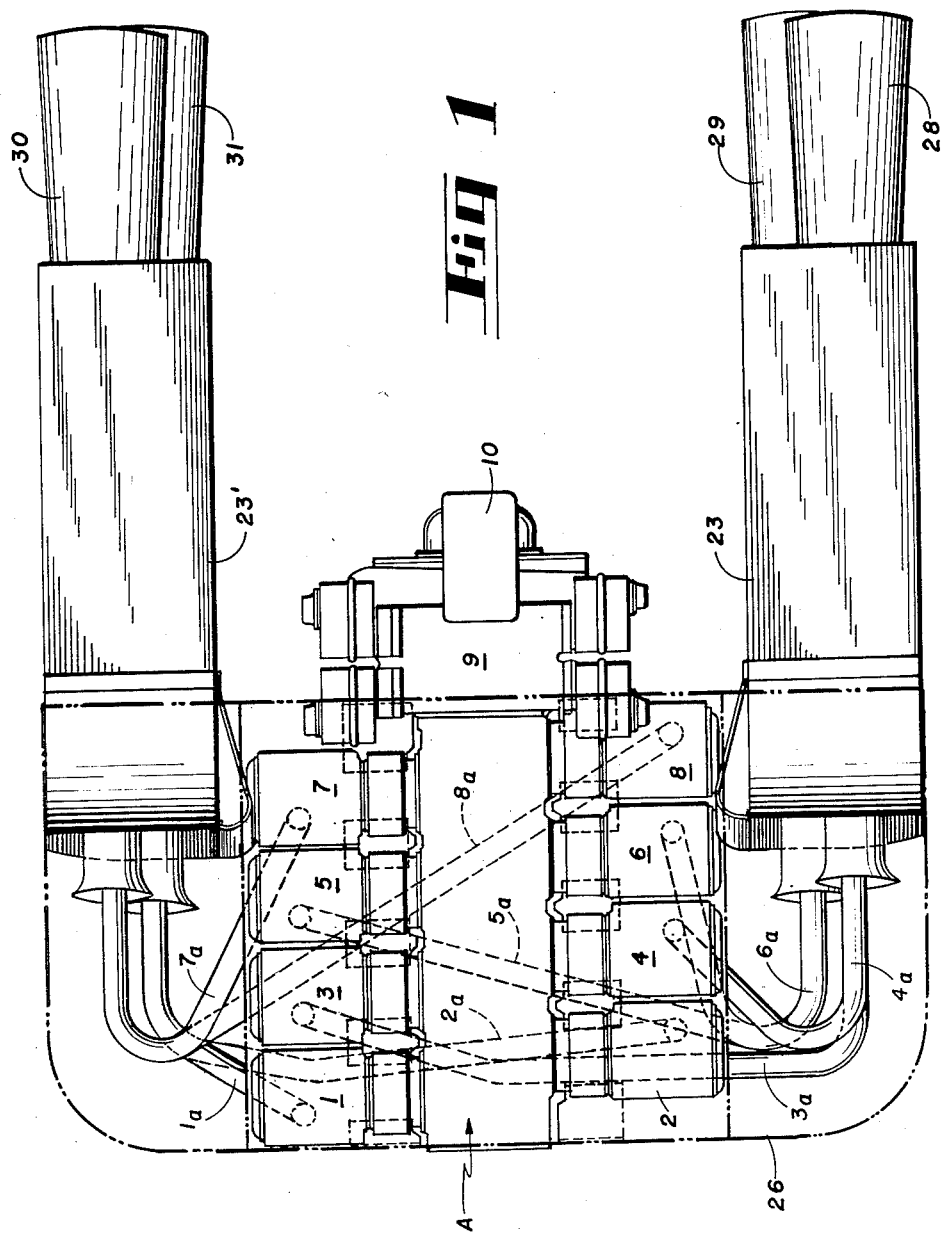
Figure 1 is a plan view of an air-cooled aircraft engine and ejector cooling installation.
Figure 2:
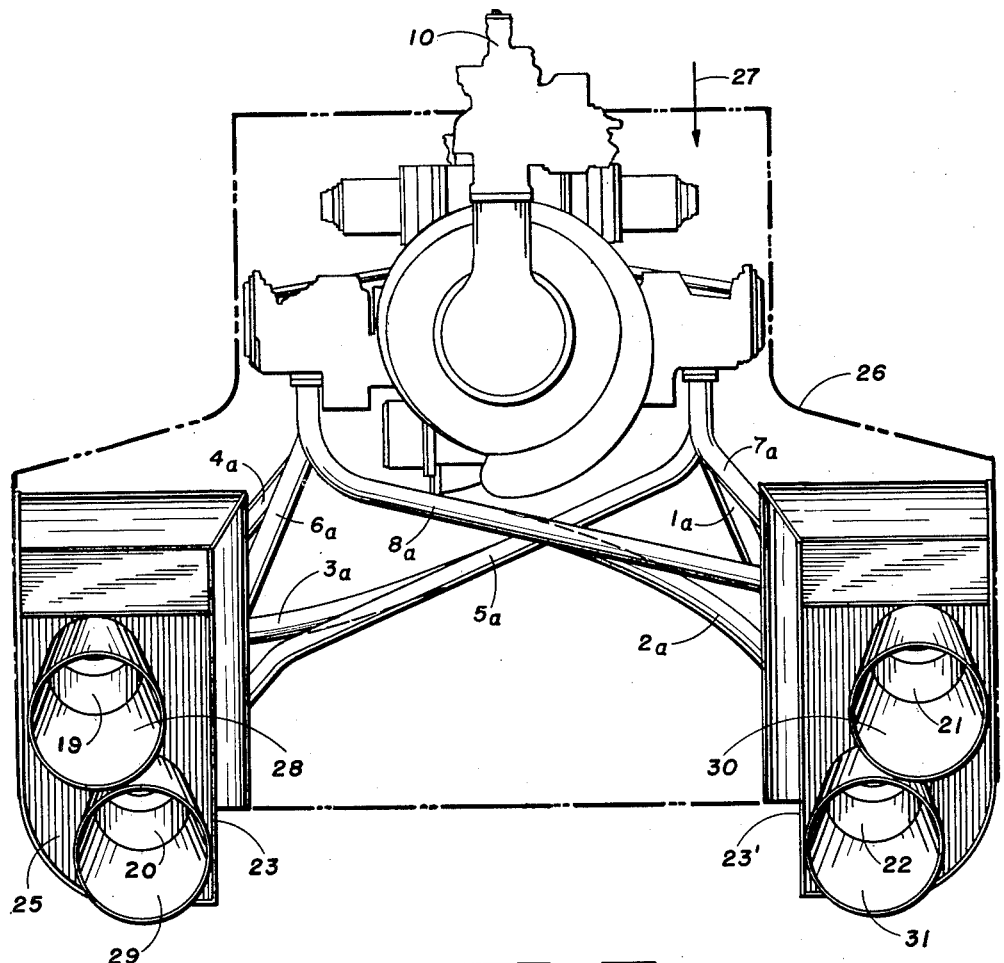
Figure 2 is a rear elevational view of the engine and ejector cooling installation shown in Figure 1.

Referring to Figure 1 there is shown an opposed cylinder air-cooled engine, generally designated A, having opposed cylinders numbered 1 through 8 inclusive. For the purposes of this invention, this engine may be considered a conventional four-cycle engine having a single crankshaft (not shown), an accessory section 9 and a fuel induction system 10.

Each cylinder is provided with an exhaust pipe, to be more specifically described and designated hereinafter. These exhaust pipes are joined in pairs, each pair communicating with a nozzle, the nozzles on the left side of the engine being designated 11 and 12 while those on the right side of the engine are designated 13 and 14.

Each nozzle delivers the products of combustion, received from its communicating exhaust pipes, to a first augmentor, the augmentors associated with nozzles 11 through 14 being correspondingly designated 15 through 18 respectively. Each nozzle and its associated augmentor forms an ejector for inducing a flow of cooling air over the engine in a manner to be described more specifically later in this specification.

Figure 3:
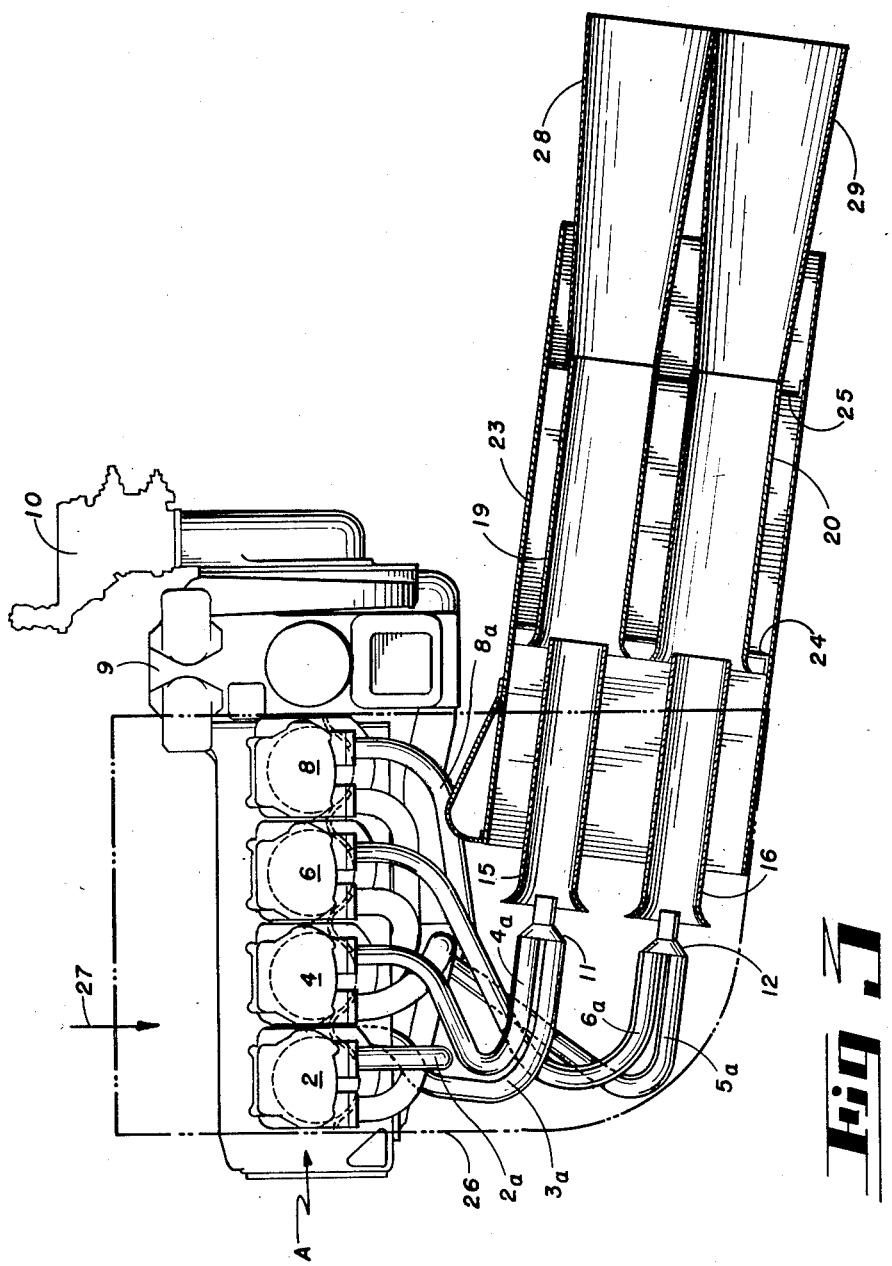
Figure 3 is a left side elevational view of the engine and cooling installation shown in Figure 1 with certain augmentors and parts of the surrounding housing shown in longitudinal section.
Figure 4:
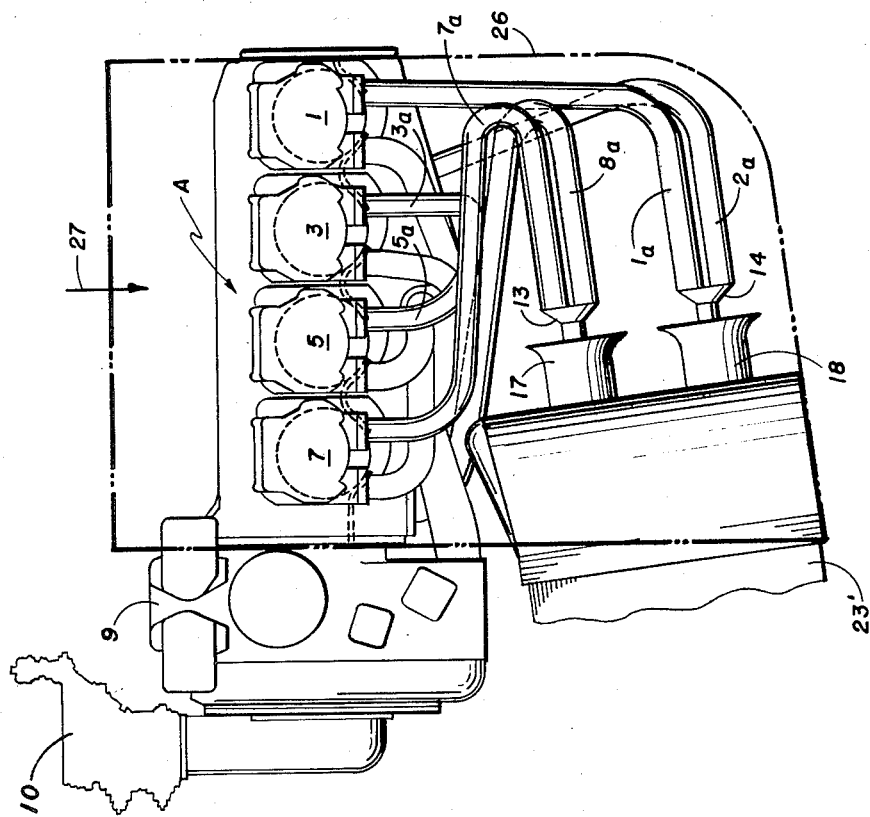
Figure 4 is a right side elevational view of the installation, a portion of the ejectors being cut away to simplify the illustration.

Each of the augmentors 15 through 18 delivers the exhaust gases to a second related augmentor correspondingly designated 19 through 22, respectively. The installation can best be understood by reference to Figure 3 which shows the exhaust nozzles 11 and 12 delivering products of combustion from the engine to augmentors 15 and 16, respectively, which in turn deliver the same products of combustion plus cooling air to augmentors 19 and 20. The augmentors on the left side of the engine, as shown in Figure 3, are positioned within a sheet metal housing 23 having transverse bulk heads 24 and 25 for positioning and supporting the augmentors. A similar housing 23' encloses the augmentors on the right side of the engine.

Indicated by phantom lines is the outline of a sheet metal enclosure 26 which surrounds the engine and constrains cooling air to enter above the engine, as at 27, and to flow past the cylinders to the inlets of the augmentors. The high velocity flow of exhaust gas from the nozzles 11 and 12 into augmentors 15 and 16 induces a flow of cooling air through enclosure 26 and past the cylinders, thereby cooling the engine to proper operating temperatures. Some of the cooling air flowing past the cylinders enters housings 23 and 23' and flows through the inlets of the second augmentors 19—22, such airflow being induced by the flow of gases from augmentors 15—18 into augmentors 19—22, respectively.

It is to be noted that all of the augmentors included in the installation contribute to establishing a flow of cooling air over the engine.

It will be appreciated by those skilled in the art that the nozzles and first augmentors constitute a plurality of ejectors which operate to establish a flow of cooling air over the engine and that the flow of cooling air is increased by the second set of augmentors which may be viewed as second stages of the first ejectors.

A mixture of combustion products and cooling air leaves the staged ejectors by means of diffuser sections, designated 28 through 31, which also increase the overall efficiency of the system.

Exhaust pipe installation

In a 4-cycle opposed cylinder engine of the type illustrated, the firing order commonly used is 15832674. In order to provide as uniform a flow of exhaust products through the nozzles 11 through 14 as is possible, it is desirable to join to a common nozzle the exhaust pipes of cylinders which exhaust at 360° intervals of crankshaft rotation. Thus, in the case of the engine illustrated, the exhaust pipes from cylinders 1 and 2 are joined to nozzle 14; those from cylinders 3 and 4 are joined to nozzle 11; those from cylinders 5 and 6 are joined to nozzle 12, while those from cylinders 7 and 8 are joined to nozzle 13. To facilitate identification in the associated figures, these exhaust pipes have been designated 1a, 2a, 3a, 4a, 5a, 6a, 7a, and 8a corresponding with the number of the cylinder from which the pipe receives exhaust gases.

A consideration of the structure disclosed to this point will reveal that the ejectors form exhaust pumps for establishing cooling airflow over the engine. Further, each ejector installation, comprising a nozzle, first augmentor, second augmentor and diffuser section, is supplied with a flow of exhaust gas from cylinders which exhaust after equal time intervals (assuming that the engine is running at constant speed). Thus, in a system in which a periodic flow of gases is inherent, the organization and arrangement of the exhaust pipes is such as to assure as uniform a flow of exhaust gases through each ejector installation as is possible under the circumstances, due regard being had for interference effects of exhaust gas pulsations as discussed hereinafter.

It has been found from actual experiments made on an installation of this type that a relatively uniform flow of cooling air can be established through each ejector installation, and that the combined operation of all of the ejector installations establishes an adequate and satisfactory flow of cooling air over the engine. Naturally, the weight of cooling air flow is dependent upon the velocity of the flow of exhaust gases which, in turn, is a direct function of the power output of the engine. Also, other parameters being equal, the heat loss to cooling of the engine is also a direct function of engine power output. As the power output of the engine is increased the heat dissipation of the cylinders increases and the demand for higher cooling air flow is met by the increased velocity of the exhaust gases. Thus, by proper design of the ejector system, the engine's operating temperature is held relatively constant regardless of the engine power output.

As will be appreciated by those skilled in the art, the before-described organization of exhaust pipes provides phased exhaust impulses through the nozzles 11 through 14. This phasing of exhaust impulses not only favors optimum operation of the ejectors but also prevents interference between the exhaust impulses from one cylinder and those of the other cylinder communicating with a common nozzle. The phased relationship of the exhaust impulses is of basic importance, not only to the satisfactory operation of the ejector installations but also the proper performance of the engine without significant loss of power.

Exhaust pipe proportionality

The proportionality of each exhaust pipe is also important to the proper operation of the system. In many engine installations, the shortest possible exhaust pipes are used to avoid impeding the flow of exhaust gases from the cylinders as the exhaust valves open.

Provision of relatively long exhaust pipes illustrated in the attached figures might suggest a sacrifice of net power output, but it has been found by actual tests that the exhaust pipes can be suitably proportioned so as not only to avoid loss of power but to increase available power under conditions of satisfactory engine cooling.

Exhaust pipe proportionality can be determined theoretically on the premise that each pipe operates somewhat like an organ pipe with one closed end, pressure surges being established in each pipe by the energy of the exhaust gases as they enter the pipe from the associated cylinder. In broad terms, it is desirable to so proportion each pipe that the pressure surge establishes adjacent the associated exhaust valve an evacuated condition or rarefaction at the time the valve opens or shortly thereafter. In this way, the maximum possible pressure differential may be established across the exhaust valve to foster flow of exhaust gases from the cylinder into the pipe, thereby improving scavenging of the cylinder with obvious benefits to engine performance.

The exhaust pipe may be considered as a stopped organ pipe, the stopped end of which is closed by the exhaust valve when it is effectively on its seat. The exciting force is supplied by the passage of the exhaust gases through this pipe, and is considered to be applied at the instant of the effective closing of the exhaust valve. The air column in a stopped pipe vibrates in such a manner that one-quarter wave length is equal to the length of the pipe. The frequency of the pulsations within the pipe may be expressed:

$$F = \frac{n+k}{t} \tag{1}$$

Where $F$=Resonant frequency in cycles per second
$n$=Number of complete pulsations in pipe
$t$=The time interval in seconds between the application of the exciting force (effective closing of exhaust valve) and the desired rarefaction adjacent the exhaust valve (effective opening of exhaust valve)
$k$= 0.25

The significance of Equation 1 is explained as follows: Since the direction of the exciting force is from the stopped end toward the open end of the pipe a peak rarefaction at the stopped (exhaust valve) end will occur at the instant the wave has traveled ¼ wave length. Peak rarefactions of decreasing amplitude occur to $n+\frac{1}{4}$ cycles. The rarefaction varies as the negative half cycle of a sine wave and extends from $n+0$ to $n+\frac{1}{2}$ cycles. Peak positive pressure amplitudes occur at $n+\frac{3}{4}$ cycles and the positive half cycle extends from $n+\frac{1}{2}$ through $n+\frac{3}{4}$ to $n+1$ cycles. The positive half cycle is avoided since it would have a destructive interference with proper cylinder scavenging. Constructive use of the wave is assured because of the manner in which the ($k$) of Equation 1 is chosen. Stated differently, the pulsation, or variation of pressure, at any point in the exhaust pipe may be represented as a sine wave; adjacent the exhaust valve, the pressure must vary sinusoidally through an integral number of complete cycles, plus an additional quarter cycle thereby establishing adjacent the valve at the time it opens a minimum pressure value. It is for this reason that the $k$ value of 0.25 is added to $n$ in the formula.

The second basic equation to be considered is:

$$Y = \frac{V}{F} \tag{2}$$

Where $Y$=Wave length of the pulsation in feet
$V$=Velocity of sound in air in feet per second
$F$=Frequency of pulsation in cycles per second Equation 2 is a simple basic equation which is well-known to those familiar with wave theory.

The velocity of sound in air ($V$) may be found from Equation 3:

$$V = 1053 + 1.082 \times °F. \tag{3}$$

Where ° F. is the temperature of the medium in degrees Fahrenheit.

In the following formula L represents the desired length of the pipe in inches.

$$L = \frac{Y}{4} \times 12 = 3Y \tag{4}$$

Combining Equations 1 through 4, the following complete expression results:

$$L = \frac{[3159 + (3.24 \times °F)] \times t}{n+k} \tag{5}$$

The value of $t$ may be expressed:

$$t = \frac{d}{360} \times \frac{60}{N} \text{ or } t = \frac{.167d}{N} \tag{6}$$

Where $d$=Number of degrees of crankshaft rotation between the effective closing of the exhaust valve of the cylinder supplying the exciting force and the effective opening of the same exhaust valve or, of the exhaust valve of the cylinder mutually joined to it by the exhaust pipe system
$N$=Engine speed, revolutions per minute In using Equation 5 to determine the necessary length of exhaust pipe an average value of 1200° F. may be used. Obviously, this value varies with any parameter affecting the exhaust gas temperature, such as fuel air ratio, engine thermal efficiency, engine installation, etc., but is a typical value representative for an engine of the type illustrated.

It should be pointed out that the value of $d$ in Equation 6 is an effective value and is not necessarily related exactly to the actual valve timing of the engine.

In practice the desirable time at which the peak rarefaction is applied at the exhaust port occurs somewhat after the exhaust valve has started to open. For this reason the term "effective" has been used in reference to opening and closing events. However, the specified valve timing events of the exhaust valve may be used to calculate an approximation of the various length exhaust pipes permissible so that a choice of lengths may be made which will fit into a given installation. Because of this and variations in exhaust gas temperature, the precise lengths are best determined by experimental methods.

In a 4-cycle engine of the type illustrated, the valve timing is such that the actual closing of the exhaust valve of a given cylinder (application of exciting force) precedes its actual opening (point where it is assumed peak rarefaction is desired) by 455 crankshaft degrees. Assuming that an exhaust pipe is desired to aid any given cylinder in its scavenging cycle at an engine speed of 3000 R. P. M. and a gas temperature of 1200° F., all of the following pipe lengths will produce a peak rarefaction at the proper instant for corresponding values of $n$ in Equation 5.

| $n$ | L, inches | $n$ | L, inches |
|---|---|---|---|
| 0 | 714 | 6 | 28.6 |
| 1 | 142.8 | 7 | 24.6 |
| 2 | 79.3 | 8 | 21.6 |
| 3 | 54.9 | 9 | 19.3 |
| 4 | 42.0 | 10 | 17.4 |
| 5 | 34 | | |

Any pipe length corresponding to an integral value of $n$ may be used since, for such integral values, a rarefaction will prevail adjacent the exhaust valve when it opens. However, the amplitude of the wave attenuates with each succeeding cycle. The highest amplitude available occurs when $n=0$ (¼ wave pipe) which gives a length of 714″. This length would be impractical except for stationary installations.

When the exhaust from two cylinders which fire at 360° intervals are joined together, the energy created by one cylinder may be used to aid the scavenging of the other and vice versa. In a 4-cycle engine of the type illustrated, the valve timing is such that, with two cylinders which fire at 360° intervals, the exhaust valve closing of one will precede the exhaust valve opening of the other by 95 crank degrees and vice versa. Thus, the time between the exciting pulse and the desired point of peak rarefaction is considerably less than occurs when one cylinder aids itself. This is a distinct advantage because the corresponding tube lengths will be considerably shorter than those determined for the single cylinder. Again assuming the effective value for $d$ in Equation 6 is 95°, the engine speed is 3000 R. P. M. and the exhaust gas temperature is 1200° F. Some of the possible lengths for resonant pipes for corresponding values of $n$ in Equation 5 are as follows:

| n | L |
|---|---|
| 0 | 149.1 |
| 1 | 29.8 |
| 2 | 16.56 |
| 3 | 11.5 |
| 4 | 8.8 |

It will be noted that for two mutually exhausted cylinders, the vibrations or pulsations in a pipe length of approximately 29″ have made but 1¼ cycles whereas in the individually exhausted cylinder the vibrations have gone through 6¼ cycles for approximately the same length of pipe. Thus, the amplitude of rarefaction has not attenuated nearly as greatly for the mutually exhausted cylinders as for the individually exhausted cylinder and the aid to cylinder scavenging has been enhanced.

While the exact diameter is not critical it is well to use a size which will permit the highest possible velocity without undue restriction. This will be appreciated from a recognition that the exciting pulses result from the momentum of the exhaust gases, this momentum varying directly with the first power of the mass of the gas and also directly as the second power of the gas velocity. Even though the mass of gas has been reduced by a reduction in exhaust pipe diameter, the momentum will be increased if the gas velocity has been enhanced. It is obvious that there will be an optimum mass-velocity combination. Each pipe of the installation illustrated has an internal diameter of 1⅝″.

Returning to a consideration of the over-all installation, it should be noted that each exhaust pipe has been constructed with a length such that a rarefaction exists adjacent the exhaust valve of the associated cylinder when the valve opens. By combining the exhaust pipes associated with cylinders which exhaust at equal time intervals, the exhaust pulsations of the cylinders joined by exhaust pipes communicating with a common nozzle do not interfere. In fact, actual tests on the system indicate that rather than interfering, the pulsations from each of the cylinders aids in exciting pulsations in the exhaust pipe associated with the other cylinder in a fashion conducive to efficient cylinder scavenging. Stated differently, the overall operation of the system is such that the exhaust pulsation from each cylinder aids in establishing a desirable rarefaction adjacent the exhaust valve of the next cylinder exhausting to the common nozzle through which the exhaust products from both of the cylinders flow.

The pulsations in the exhaust pipes are cyclical and vary around an average mean value similar in wave form to a sine wave. Thus, the pressure at the exhaust valve will vary from an average to a peak negative value in ¼ cycle, from a peak negative value from ¼ to ½ cycle, from an average value to a peak positive value from ½ to ¾ cycle and back to an average value from ¾ to the completion of the cycle. It thus may be seen that a negative value of pressure is present in the pipe for practically ½ cycle of the vibrating column. If the exhaust valve affected by this pressure wave is opened at any time during this negative half cycle, the scavenging will be enhanced reaching a peak effectiveness at the ¼ cycle point. Once the length of a given exhaust pipe has been fixed, its effect will be greater at the operating speed for which it was designed. It will also be effective over the complete negative half cycle, i. e., when $k$ of Equation 1 varies from 0 to ½. Once the frequency F is fixed, a change in the value of $k$ requires a change in the value of $t$ to satisfy the requirements of Equation 1. Thus, by substituting Equation 6 for $t$ of Equation 1 and determining the value of F for a design speed of 3000 R. P. M. and a 3¼ cycle pipe ($k=0.25$), it can easily be determined that the pipe will be effective over a speed range (N) from approximately 2785 R. P. M. to approximately a speed of 3250 R. P. M. for values of $k$ between 0.5 to 0.0, respectively. Likewise, a 7¼ cycle pipe will be effective over a narrower speed range of 2900 to 3100 R. P. M.

SUMMARY

A consideration of the foregoing discussion will make it evident that the present invention provides a system whereby the exhaust gases from an air-cooled engine can be used to operate ejectors which establish a flow of cooling air over the engine without significant sacrifice of the net power output of the engine. Further, net engine output is increased through a preferred combination of exhaust pipes which not only establishes efficient ejector operation but also efficient scavenging of the cylinders. From actual tests of the installation illustrated incorporating an engine rated at 400 H. P. @ 3400 R. P. M., it has been found that the system is effective over a relatively wide range of engine speeds, specifically from 2700 to 3300 R. P. M.

Through use of the present invention, an air-cooled engine may be operated satisfactorily in a submerged installation. The preferred embodiment is particularly useful when installed in a helicopter but is not limited to such use and may also be used effectively wherever it is necessary or desirable to establish a flow of cooling air over the engine without resorting to cooling fans and other complicated mechanical drives.

Having described a preferred embodiment of my invention, I claim:

1. In an engine installation, an internal combustion engine including a plurality of cylinders, exhaust pipes communicating with each of said cylinders, a plurality of exhaust gas nozzles, each of said nozzles being in communication with a pair of said exhaust pipes which communicate with cylinders firing at equally spaced time intervals during constant speed operation of said engine, an augmentor associated with each of said exhaust gas nozzles, a second augmentor associated with each of said first-mentioned augmentors, and a housing surrounding said augmentors and said engine whereby a flow of cooling air may be induced to flow over said cylinders and through said augmentors by virtue of discharge of exhaust gases from said cylinders through said exhaust pipes and said exhaust gas nozzles.

2. In combination, an air-cooled internal combustion engine including at least two cylinders, an exhaust pipe in communication with each of said cylinders, exhaust gas nozzles equal in number to one-half the number of cylinders, a pair of exhaust pipes communicating with cylinders firing at evenly spaced time intervals during constant speed operation of said engine being connected to each of said exhaust gas nozzles, and augmentors in communication with each of said exhaust gas nozzles, said augmentors also being in communication with the cooling airflow over said cylinders of said engine whereby flow of exhaust gas from said cylinders through said nozzles and said augmentors induces a flow of cooling air over said cylinders.

3. In combination, an air-cooled internal combustion engine including a plurality of cylinders, an exhaust pipe in communication with each of said cylinders, a plurality of exhaust gas nozzles, exhaust pipes from cylinders firing at equal time intervals during constant speed operation of said engine being connected to each of said exhaust gas nozzles, an augmentor for receiving exhaust gas from each of said exhaust gas nozzles, a second augmentor for receiving gas flow from each of said first-named augmentors, and housing means surrounding said augmentors for directing cooling airflow over said engine and through said augmentors, said cooling airflow being induced by the flow of exhaust gases from said cylinders through said exhaust pipes and exhaust gas nozzles.

4. In combination, an air-cooled internal combustion engine having a plurality of cylinders, exhaust pipes connected to each of said cylinders to receive exhaust gases discharged thereby, a plurality of exhaust gas nozzles, each of said nozzles being connected to a pair of exhaust pipes which communicate with cylinders firing at equally spaced time intervals during constant speed operation of said engine, said exhaust pipes being proportioned to have a natural frequency of pressure pulsations resulting from discharge of cylinder exhaust gases proportionate to the frequency of exhaust gas discharge from said cylinders associated with a given exhaust gas nozzle, and cooling air augmentors for receiving exhaust gases from said exhaust gas nozzles.

5. In combination, an air-cooled internal combustion engine including at least two cylinders, an exhaust pipe in communication with each of said cylinders, exhaust gas nozzles equal in number to one-half the number of said cylinders, a pair of exhaust pipes communicating with cylinders firing at evenly spaced time intervals during constant speed operation of said engine being connected to each of said exhaust gas nozzles, said exhaust pipes being proportioned to have a natural frequency of pressure pulsations within each of said paired pipes resulting from discharge of exhaust gases from said associated cylinders of such a value that a rarefaction prevails adjacent each cylinder at the time of exhaust gas discharge therefrom, and an augmentor associated with each of said nozzles for receiving exhaust gases therefrom, means for directing cooling air over the engine and to the region of said augmentors said augmentors inducing a flow of cooling air over said engine.

6. Apparatus as defined in claim 5 and, in addition, a second cooling air augmentor positioned to receive gas flow from each of said first-named augmentors.

7. In combination, an air-cooled internal combustion engine including a plurality of cylinders, an exhaust pipe connected to each of said cylinders to receive periodic discharges of exhaust gas therefrom, a plurality of exhaust gas nozzles, a plurality of said exhaust pipes being connected to each of said nozzles, said exhaust pipes connected to each nozzle communicating with cylinders firing at equally spaced time intervals during constant speed operation of said engine, said exhaust pipes connected to a given nozzle being proportioned to have a natural frequency of pressure pulsations resulting from periodic discharge of exhaust gases from said associated cylinders of such a value that a rarefaction prevails adjacent each cylinder at the time of exhaust gas discharge therefrom, and a cooling air augmentor positioned adjacent each of said nozzles for receiving exhaust gases therefrom.

8. In combination, an air-cooled internal combustion engine including a plurality of cylinders, an exhaust pipe connected to said cylinders to receive periodic discharges of exhaust gas therefrom, a plurality of exhaust gas nozzles, a plurality of said exhaust pipes being connected to each of said nozzles and communicating with cylinders firing at equally spaced time intervals during constant speed operation of said engine, the natural frequency of pressure pulsations within each of said pipes connected to a given nozzle resulting from periodic discharge of exhaust gases from said associated cylinders having such a value that a rarefaction prevails adjacent each cylinder at the time of exhaust gas discharge therefrom, a first augmentor positioned adjacent each of said nozzles for receiving exhaust gases therefrom, a second augmentor positioned to receive gases from each of said first augmentors, and housing means surrounding said augmentors and said engine for directing cooling airflow over said engine and through said augmentors, said cooling airflow being induced by the flow of exhaust gases from said cylinders through said exhaust pipes and exhaust gas nozzles.

9. In combination, an internal combustion engine including a plurality of cylinders, an exhaust pipe in communication with each of said cylinders, a plurality of exhaust gas nozzles, exhaust pipes from cylinders firing at equal time intervals during constant speed operation of said engine being connected to each of said exhaust gas nozzles, an augmentor for receiving exhaust gas from at least one of said nozzles, and means surrounding portions of said engine requiring cooling and communicating with said augmentor for directing cooling air over said engine portions and to said augmentor which functions as a cooling air pump operated by a flow of exhaust gas from said nozzle.

10. In combination, an air-cooled internal combustion engine having a plurality of cylinders, exhaust pipes connected to each of said cylinders to receive exhaust gases discharged thereby, a plurality of exhaust gas nozzles, each of said nozzles being connected to a pair of exhaust pipes which communicate with cylinders firing at equally spaced time intervals during constant speed operation of said engine, said exhaust pipes being proportioned to have a natural frequency of pressure pulsations resulting from discharge of cylinder exhaust gases proportionate to the frequency of exhaust gas discharge from said cylinders associated with a given exhaust gas nozzle, first cooling air augmentors for receiving exhaust gases from said exhaust gas nozzles, and second cooling air augmentors for receiving gas flow from said first-mentioned augmentors.

References Cited in the file of this patent

UNITED STATES PATENTS

| 1,025,251 | Desmond | May 7, 1912 |
| 2,410,856 | Koppen | Nov. 12, 1946 |

FOREIGN PATENTS

| 916,985 | France | Dec. 20, 1946 |
| 980,900 | France | Jan. 3, 1951 |